United States Patent [19]

Hertel

[11] 3,982,709
[45] Sept. 28, 1976

[54] FILM CORE WITH RESTRAINER

[75] Inventor: Heinz E. Hertel, Mount Prospect, Ill.

[73] Assignee: Bell & Howell Company, Chicago, Ill.

[22] Filed: Aug. 18, 1975

[21] Appl. No.: 605,487

[52] U.S. Cl. ................................................ 242/74
[51] Int. Cl.² ......................................... B65H 75/28
[58] Field of Search ......... 242/74, 28.3, 125, 125.1, 242/194, 195; 197/175

[56] References Cited
UNITED STATES PATENTS

| | | | |
|---|---|---|---|
| 2,189,547 | 2/1940 | Fischer | 242/74 X |
| 2,571,796 | 10/1951 | Ulmschneider | 242/74 X |
| 2,951,656 | 9/1960 | Wellman | 242/74 X |

Primary Examiner—Edward J. McCarthy
Attorney, Agent, or Firm—Robert A. Walsh

[57] ABSTRACT

The disclosure relates to a core for holding web material. The core includes a first cylinder having an axis of rotation and an axially extending slot for receiving the web material, a second cylinder within the first cylinder and substantially concentric with the first cylinder about the axis to form an annular channel therebetween and an annular channel floor between the first and second cylinders to maintain the cylinders in fixed substantially concentric relation. The core also includes a post within the annular channel and angularly spaced from the axial slot beyond the point of tangency between the outer peripheral surface of the second cylinder and the axial slot. With an end of the web doubled over and threaded through the slot into the channel and looped around the post, the conjoint effect of the restraining action of the post on the web and the frictional contact between the resulting two layers of the web about the second cylinder holds the web securely to the core.

11 Claims, 2 Drawing Figures

FILM CORE WITH RESTRAINER

BACKGROUND OF THE INVENTION

The present invention is generally directed to a core for holding web material and in particular to a core for holding film within a film cartridge.

Cores for holding web material are well known in the art. Such devices find considerable application in film cartridges for microfilm readers. Microfilm readers generally includes an integral container providing its own film aperture plate and in which a spool of microfilm can be stored or used merely by snapping the cartridge over the spindles of the reader transport apparatus. By keeping the film in the cartridge, the two hubs of the cartridge may be spaced apart less than twice the radial dimension of the accumulated film. Thus, there is completely eliminated any necessity for the operator to thread the film after reference has been made to any specific micro image on the film. Additionally, the integral cartridge container offers positive protection of the film. In actual use, cartridges hold as much as 215 feet of 0.003 film which never leaves the cartridge.

Such cartridges utilize film cores for holding the web film material and which rotate so that the film is wound about the cores. During the operation of such devices, it is occasionally necessary to completely rewind the film which places a relatively high pulling force on the film when the film is completely rewound. Thus, it is one requirement of the film cores to securely hold the film so that the end of the film does not break loose from the film cores during such operation.

While film cores in the past have been generally successful, they have been relatively complicated ad expensive to produce because they usually require a plurality of individual parts. Thus, in fabricating such cores, it is necessary to fabricate more than one part and then assemble the parts with the film in order to provide a complete cartridge.

It is therefore a general object of the present invention to provide a new and improved core for holding web material.

It is a more specific object of the present invention tp provide a new and improved core for holding microfilm within a microfilm cartridge.

It is a still more particular object of the present invention to provide a core for holding web film material which securely holds the film and which includes only a single part rendering the improved core less expensive to manufacture.

SUMMARY OF THE INVENTION

The invention provides a core for holding web material comprising a first cylinder having an axis of rotation and an axially extending slot for receiving the web material, a second cylinder within the first cylinder and substantially concentric with the first cylinder about the axis of rotation to thereby form an annular channel between the outer peripheral surface of the second cylinder and the inner surface of the first cylinder, the annular channel communicating with the axial slot. The core additionally comprises spacing means between the first and second cylinders to thereby maintain the first and second cylinders in fixed substantially concentric relation and a post within the annular channel and angularly spaced from the axial slot beyond the point of tangency between the slot and the outer peripheral surface of the second cylinder. As a result, with the end of the web materials threaded through the slot into the annular channel, along the outer periphral surface of the second cylinder, around the post, back through the channel, and out the slot, the conjoint action of the restraining effect of the post on the web material and the frictional contact between the resulting two layers of web material about the outer peripheral surface of the second cylinder securely holds the web not withstanding pulling forces applied to the web.

BRIEF DESCRIPTION OF THE DRAWINGS

The features of the present invention which are believed to be novel are set forth with particularity in the appended claims. The invention, together with further objects and advantages thereof, may best be understood by reference to the following description taken in conjunction with the accompanying drawings, and in the several figures of which like reference numerals identify like elements, and in which:

DESCRIPTION OF THE PREFERRED EMBODIMENT

Referring now to the Figures, the core thereshown comprises a first cylinder 10, a second cylinder 11, an annular floor 12 between the first and second cylinders, and a post 13.

Figure 1:
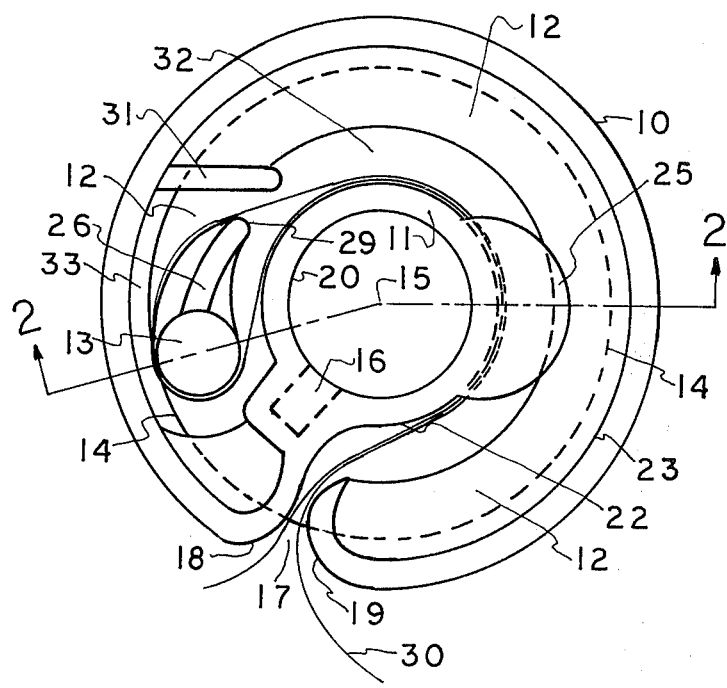
FIG. 1 is a top view of a core for holding web material embodying the present invention.
Figure 2:
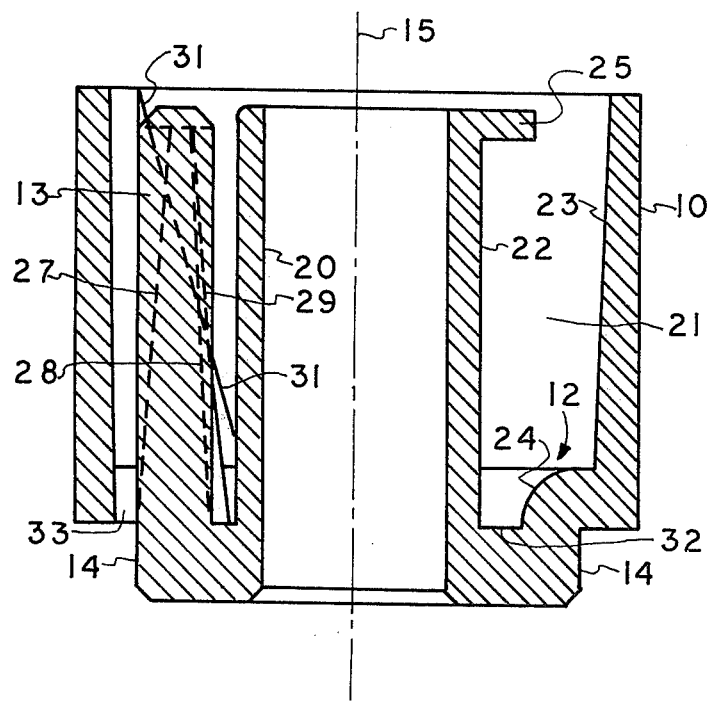
FIG. 2 is a cross-sectional view taken along lines 2—2 of FIG. 1.

The first cylinder 10 includes a recessed portion 14 to be received by a circular opening in the film cartridge for confining the core as it rotates about its axis of rotation 15. In a conventional manner, the core of FIGS. 1 and 2 is adapted to be driven by a keyed spindle and to that end, the second cylinder 11 includes an axial recess 16 on it inner surface 20 to engage the driven spindle.

The first cylinder 10 includes an axial slot 17 of sufficient dimension for receiving the web film material 30. A curved entry portion to axial slot 17 is also provided with curved peripheral surfaces 18 and 19.

The second cylinder 11 is within the first cylinder and is substantially concentric with the first cylinder about the axis of rotation 15. As a result, an annular channel 21 is formed between the outer peripheral surface 22 of the second cylinder and the inner surface 23 of the first cylinder. The annular channel floor 12 extends between the first and second cylinders for spacing the first and second cylinders and to thereby maintain the first and second cylinders in fixed substantially concentric relation. The axial sot 17 communicates with the annular channel 21 as shown, to give the film 30 access to the annular channel 21.

The annular channel floor 12 includes a tapered or curved portion 24 and a bottom 32 integral with the tapered portion. The tapered portion 24 directs the film against the outer surface 22 of the second cylinder and into the bottom 32 of the annular channel in a manner to be described hereinafter. To confine the film within the annular channel and to preclude axial movement of the web, second cylinder 11 includes a flange 25 which extends from the outer peripheral surface 22 of the second cylinder at the top edge thereof.

Post 13 is within the annular channel and is secured to and extends from the annular channel floor 12. Post 13 is also angularly spaced from the axial slot 17 beyond the point of tangency between the axial slot 17 and the outer peripheral surface 22 of the second cylinder 11 for reasons to be explained hereinafter. In this preferred embodiment, to insure that the post is angularly spaced from the axial slot 17 at a point well beyond the point of tangency between axial slot 17 and the outer peripheral surface 22 of second cylinder 11, the post is located at a point substantially adjacent to axial slot 17.

Because the bottom of the first cylinder 10 is recessed with recessed portion 14, in order to insure that the film rests against the bottom 32 of the annular channel floor, an arcuate slot is provided to allow the film to rest at a level corresponding to the level of the bottom 32 of the channel floor 12.

In securing the end of the web material, one end of the film is threaded through the axial slot 17 into the annular channel 12, along the outer peripheral surface 22 of the second cylinder 11, around post 13, back through channel 12, and out the slot 17 as shown in FIG. 1. With the film looped around post 13 and with the resulting two layers of film 30 being in frictional contact about the outer peripheral surface 22 of the second cylinder 11, the film is securely held by the core not withstanding pulling forces applied to the film.

To aid in the threading of the film into the core, post 13 includes a leading tapered portion 26. The leading tapered portion 26 has side walls 27 and 28 which are arced in a counter-clockwise direction and terminates at 29.

As a further aid to threading the web into the core, the core additionally comprises a tapered rib 31 which is adjacent post 13 and inbetween the post and the axial slot 17. The rib 31 aids in directing the web into the bottom 32 of channel floor 12 and also provides additional structural strength for the core. As can be best seen in FIG. 1, the tapered or curved portion 24 of channel floor 12 terminates at the tapered rib 31.

While the preferred embodiment of this invention has been described relative to its use for holding and securing microfilm it of course may be utilized for holding any type of web material. The conjoint action of the web restraining effect of post 13 and the frictional contact between the resulting two layers of the web material about the outer surface 22 of the second cylinder 11 causes the web to be securely held even though the ends of the web material are subjected to extreme pulling forces. Also, as the core rotates, the two layers of film are also caused to become in frictional contact with each other about one of the peripheral curved surface portions 18 or 19 to further aid in the holding of the film to the core.

The core of the present invention is comprised of a single part which may be molded out of plastic on a high production basis and at low cost. Additionally, because the core includes only one part, there is no resultant assembly time required further reducing the cost of utilizing the core of the present invention.

While a particular embodiment of the invention has been shown and described, modifications may be made, and it is intended in the appended claims to cover all such modifications as may fall within the true spirit and scope of the invention.

We claim:
1. A core for holding web material comprising:
a first cylinder having an axis of rotation and an axially extending slot for receiving the web material;
a second cylinder within said first cylinder and substantially concentric with said first cylinder about said axis of rotation to thereby form an annular channel between the outer peripheral surface of said second cylinder and the inner surface of said first cylinder, said annular channel communicating with said axial slot;
spacing means between said first and second cylinders to thereby maintain said first and second cylinders in fixed substantially concentric relation; and
a post within said annular chanel and angularly spaced from said axial slot beyond the point of tangency between said slot and the outer peripheral surface of said second cylinder; whereby;
with the end of the web material threaded through said slot into said annular channel, along the outer peripheral surface of said second cylinder, around said post, back through said channel, and out said slot, the conjoint action of the restraining effect of said post on the web material and the frictional contact between the resulting two layers of web material about the outer peripheral surface of said second cylinder securely holds the web not withstanding pulling forces applied to the web.

2. A core for holding web material in accordance with claim 1 wherein said first cylinder includes a curved entry portion into said slot for providing a peripheral curved surface to cause the two layers of web material to obtain additional frictional contact when the core is rotated.

3. A core for holding web material in accordance with claim 1 wherein said spacing means comprises an annular channel floor between said first and second cylinders.

4. A core for holding web material in accordance with claim 3 wherein said annular floor includes a tapered portion for directing the web material against the outer surface of said second cylinder.

5. A core for holding web material in accordance with claim 3 wherein said second cylinder includes a flange extending from the outer peripheral surface at the top edge thereof for confining axial movement of the web material along the outer peripheral surface of said second cylinder.

6. A core for holding web material in accordance with claim 3 wherein said post is secured to and extends from said annular channel floor.

7. A core for holding web material in accordance with claim 6 wherein said post includes a leading tapered portion for guiding the web around said post.

8. A core for holding web material in accordance with claim 1 wherein said core is adapted to be rotated by a driven spindle and wherein said second cylinder includes an axial recess on the inner surface thereof for engaging the driven spindle.

9. A core for holding web material in accordance with claim 1 further comprising a tapered rib adjacent said post inbetween said post and said slot for guiding the web into said annular channel in the vicinity of said post.

10. A core for holding web material in accordance with claim 1 wherein said post is substantially adjacent to said slot.

11. A core for holding web material comprising:
a first cylinder having an axis of rotation and an axially extending slot for receiving the web material;
a second cylinder within said first cylinder and substantially concentric with said first cylinder about said axis of rotation to thereby form an annular channel between the outer peripheral surface of said second cylinder and the inner surface of said first cylinder, said annular channel communicating with said axial slot, and a flange extending from said outer peripheral surface at the top edge thereof;

spacing means comprising an annular floor between said first and second cylinders to thereby maintain said first and second cylinders in fixed substantially concentric relation, said annular floor including a tapered portion for directing the web against the outer surface of said second cylinder; and, a post within said annular channel secured to and extending from said annular floor and angularly spaced from said axial slot beyond the point of tangency between said slot and the outer peripheral surface of said second cylinder.

\* \* \* \* \*